United States Patent [19]

Ozawa

[11] Patent Number: 5,625,849
[45] Date of Patent: Apr. 29, 1997

[54] FOCUS STATE DETECTION DEVICE AND METHOD

[75] Inventor: Masamitsu Ozawa, Kanagawa-ken, Japan

[73] Assignee: Nikon Corporation, Tokyo, Japan

[21] Appl. No.: 391,175

[22] Filed: Feb. 21, 1995

[30] Foreign Application Priority Data

Feb. 21, 1994 [JP] Japan .................................. 6-022746

[51] Int. Cl.⁶ .................................................. G03B 13/36
[52] U.S. Cl. ............................................................ 396/114
[58] Field of Search ..................... 354/402, 406, 354/407, 408; 250/201.2, 201.7, 201.8

[56] References Cited

U.S. PATENT DOCUMENTS

| | | | |
|---|---|---|---|
| 4,774,539 | 9/1988 | Suda et al. | 354/406 |
| 4,908,504 | 3/1990 | Karasaki et al. | 250/201.2 |
| 4,949,116 | 8/1990 | Karasaki et al. | 354/408 |
| 5,109,154 | 4/1992 | Higashihara et al. | 250/201.8 |
| 5,160,834 | 11/1992 | Moriyama | 250/201.8 |
| 5,233,173 | 8/1993 | Moriyama | 250/201.8 |

*Primary Examiner*—W. B. Perkey
*Attorney, Agent, or Firm*—Oliff & Berridge

[57] ABSTRACT

A focus state detection device includes focus state detection optical systems having focus state detection regions off the optical axis of the object lens (in the lateral areas of the field) that extend in a radial direction relative to the optical axis of the shooting lens. In each focus state detection optical system, images from the object lens are composed into secondary images on a pair of rows of photosensitive elements, and the focussing state of the object lens is detected from the positional relationship between these secondary images. The focus state detection optical systems have a first focus state detection region located on the optical axis of the predicted focussing plane of the object lens, and a second focus state detection region located off the optical axis of the predicted focussing plane and along a radial direction relative to the optical axis. The distance between outer edges of the pair of apertures of the diaphragm mask corresponding to the second focus state detection region is established so as to be smaller than the distance between outer edges of the pair of apertures of the diaphragm mask corresponding to the first focus state detection region. Such structure provides a focus state detection device having a high degree of focus state detection precision without the problems of eclipsing of focus state detection light rays caused by exit pupils of the shooting lens.

40 Claims, 8 Drawing Sheets

FOCUS STATE DETECTION DEVICE AND METHOD

BACKGROUND OF THE INVENTION

1. Field of the Invention

The present invention relates to a focus state detection device in a camera or the like that uses an optimum TTL (through the lens) phase difference detection method and, in particular, it relates to a focus state detection device wherein the focussing state is detected at a plurality of regions in the shooting plane of the shooting lens (object lens).

2. Description of Related Art

The basic structure of a focus state detection device used in a camera or the like and using a TTL phase difference detection method is shown in FIG. 14. This focus state detection device is composed in order of a field mask 20, a condenser lens 30, a diaphragm mask 40, a re-imaging lens 50 and a photosensitive element 60 on the optical axis 0 of the shooting lens 1. The focus state detection optical system is comprised of the field mask 20, the condenser lens 30, the diaphragm mask 40, the re-imaging lens 50 and the photosensitive element 60. The exit pupil 10 of the focus state detection optical system is at a conjugal position with the diaphragm mask 40 via the condenser lens 30. In the case shown in the figure, the conjugal position coincides with the position of the shooting lens 1, the field mask 20 being positioned near the predicted focussing plane (film plane or the like).

Light rays that pass through the two regions 101 and 102 into which the exit pupil 10 is divided are composed into the primary image of the subject near the field mask 20 by the shooting lens 1. Light rays are extracted by the field mask 20, restricting the light rays from the subject that reach the condenser lens 30. Light rays that pass through the condenser lens 30 pass through the apertures 401 and 402 of the diaphragm mask 40, which similarly restrict unnecessary light rays, and are re-composed into secondary images on the element rows 601 and 602 in the photosensitive element 60 by the regular lens components 501 and 502 of the re-imaging lens 50.

In other words, behind the primary image composed by the shooting lens 1, two secondary images that are approximately the same as the primary image are re-composed onto the pair of rows of photosensitive elements 601 and 602 by the condenser lens 30 and a re-imaging optical system comprised of the diaphragm mask 40 and the re-imaging lens 50, the focus adjustment state of the shooting lens I being detected on the basis of the positional relationship between the two secondary images. The positional relationship between the two secondary images on the pair of rows of photosensitive elements 601 and 602 changes in accordance with the focus adjustment state of the shooting lens 1. For example, when the focus is located behind the predicted focussing plane of the shooting lens, the two secondary images become farther apart, whereas if the focus is in front of the plane, the two images become closer together. Accordingly, the proper focus state can be detected by comparing the outputs of the two rows of the photosensitive elements 601 and 602.

In a focus state detection device based on these basic principles, as explained above, in general the position of the exit pupil 10 is conjugal to the diaphragm mask 40 via the condenser lens 30. In other words, the two regions 101 and 102 of the exit pupil 10 through which light rays pass are inverted projection images of the two apertures 401 and 402 of the diaphragm mask 40 through the condenser lens 30. Hence, the regions have fixed positions and are separate and independent of each other.

Moreover, when a plurality of focus state detection regions are provided on the photographic field, this is also true of the position of the exit pupil corresponding to each of the focus state detection optical systems, all of them being symmetric relative to the optical axis 0 of the shooting lens 1.

However, with the described focus state detection device, the following problems arise.

Namely, the position of the exit pupil of the shooting lens actually mounted is not fixed, but varies depending on the type of shooting lens, there being many instances in which the position of the exit pupil of the shooting lens is not conjugal to the diaphragm mask 40 via the condenser lens 30.

Because the position of the exit pupil in actuality varies a great deal between shooting lenses, in the case of a focus state detection optical system having focus detection regions at positions off the optical axis 0 of the shooting lens along the primary image plane, i.e. in lateral areas away from the center of the photographic field, it becomes necessary to conduct focus state detection using light rays that pass through two regions of the exit pupil, which are extremely non-symmetric relative to the optical axis 0 of the shooting lens. Consequently, the problems arise that the symmetry of the two light rays is lost, a portion of the light rays being lost because of the efficacy of the apertures, thereby resulting in the creation of a so-called eclipse, making focus state detection impossible.

In particular, when the focus state detection regions are positioned in the lateral areas of the photographic field along a radial direction relative to the optical axis 0 of the shooting lens, the loss of symmetry in the two light rays is phenomenal, and the eclipse phenomenon arises easier than in focus state detection regions positioned along the circumferential direction relative to the optical axis 0 of the shooting lens.

This state is described in detail hereafter, with reference to FIGS. 1–8.

FIG. 1 is an oblique view showing the basic structure of a focus state detection optical system to which the present invention can be applied, whereas FIGS. 2–5 are frontal views showing details of the various components of the system, and FIGS. 6–8 are explanatory drawings showing the state of eclipse on the exit pupil of the shooting lens (object lens).

As shown in FIG. 1, the focus state detection optical system of this focus state detection device is provided in order with a field mask 21, a condenser lens 31, a diaphragm mask 41, a re-imaging lens 51 and a photosensitive element 61 positioned on the optical axis 0 of the shooting lens. In the state shown in the drawing, the field mask 21 and the diaphragm mask 41 are positioned off the optical axis 0 for clarity.

In the present example, a case is shown wherein focus state detection regions are situated at three locations, namely, in the lateral areas to the right and left and in the center of the photographic field. Accordingly, there are three focus state detection optical systems corresponding to the three focus state detection regions in these three locations. For example, the focus state detection optical system corresponding to the focus state detection region in the center is comprised of an aperture 21L of the field mask 21, a regular lens component 311 of the condenser lens 31, an aperture 41L of the diaphragm mask 41, a regular lens component 51L of the re-imaging lens 51 and a photosensitive element component 61L of the photosensitive element 61. Similarly, the focus state detection optical systems corresponding to the focus state detection regions separated from the center are comprised of similar components, as indicated by appended letters M and N.

Each single focus state detection optical system is generally comprised of two regions, one in the vertical direction and one in the horizontal (sideways) direction, and the parts of the field mask 21, diaphragm mask 41, re-imaging lens 51 and photosensitive element 61 of a single focus state detection optical system have a vertical component and a horizontal component. In this sense, the focus state detection device shown in FIG. 1 can be considered to have a total of six focus state detection optical systems.

FIG. 15 shows the relationship that the focus state detection regions have with the photographic field when viewed from the direction of the viewfinder of the camera (not shown in drawings). In this example, a focus state detection region VL, which extends in a vertical direction, and a focus state detection region HL, which extends in a horizontal direction, intersect to form a cross-shaped focus state detection region on the optical axis 0. In addition, a focus state detection region VM, which extends in a vertical direction, and a focus state detection region HM, which extends in a horizontal direction, intersect to form a cross-shaped focus state detection region to the left side of the screen, off of the optical axis 0. Furthermore, a focus state detection region VN, which extends vertically and a focus state detection region HN, which extends in a horizontal direction, intersect to form a cross-shaped focus state detection region to the right side of the screen, off of the optical axis 0.

The field mask 21 is placed near the predicted focussing plane of the shooting lens and restricts the regions where focus state detection is conducted in the photographic field. The field mask 21 has three apertures 21L, 21M and 21N as shown in the enlarged frontal view of the field mask 21 in FIG. 2. The aperture 21L is placed on the optical axis 0 of the shooting lens, while apertures 21M and 21N are placed at positions separated from the optical axis 0 of the shooting lens. In addition, apertures 21L, 21M and 21N are cross-shaped, being comprised respectively of approximately rectangular apertures 212, 214, and 216 in the vertical direction and apertures 211, 213 and 215 in the horizontal direction. A single rectangular aperture corresponds to one focus state detection region, so that, for example, apertures 212 and 211 correspond to two intersecting (substantially perpendicular) focus state detection regions. In addition, aperture 213 and aperture 215 correspond to focus state detection regions separated from the optical axis 0 of the shooting lens, which extend in a radial direction relative to the optical axis 0, while aperture 214 and aperture 216 correspond to focus state detecting regions separated from the optical axis 0, which extend in the circumferential direction relative to the optical axis 0.

As shown in FIG. 1, the condenser lens 31 is composed of three regular lens components 311, 312 and 313, in which the regular lens component 311 of the condenser lens 31 corresponds to the aperture 21L of the field mask 21, the regular lens component 312 corresponds to the aperture 21M and the regular lens component 313 corresponds to the aperture 21N, the condenser lens 31 collecting light rays from the shooting lens that have been restricted by the field mask 21.

As shown in the enlarged frontal view of the field mask in FIG. 3, the diaphragm mask 41 is composed of 12 apertures, namely apertures 41a, 41b, 41c and 41d (center component 41L) that restrict light rays corresponding to regular lens component 311 of the condenser lens 31, apertures 41e, 41f, 41g and 41h (side component 41M) that restrict light rays corresponding to regular lens component 312, and apertures 41i, 41j, 41k and 41l (side component 41N) that restrict light rays corresponding to regular lens component 313. Light rays from regular lens component 311 of the condenser lens 31 on the optical axis 0 of the shooting lens are divided in two in the two perpendicular directions of the apertures 41a and 41b and apertures 41c and 41d of the diaphragm mask 41. Similarly, light rays from the regular lens component 312 of the condenser lens 31 off the optical axis 0 of the shooting lens are divided in two in the two perpendicular directions of apertures 41e and 41f and apertures 41g and 41h of the diaphragm mask 41, light rays from regular lens component 313 of the condenser lens 31 off of the optical axis 0 of the shooting lens being divided in two in the two perpendicular directions of apertures 41i and 41j and apertures 41k and 41l of the diaphragm mask 41.

The re-imaging lens 51 is composed of regular lens components 51a, 51b, 51c and 51d (center component 51L) corresponding to apertures 41a, 41b, 41c and 41d of the diaphragm mask 41, regular lens components 51e, 51f, 51g and 51h (side component 51M) corresponding to apertures 41e, 41f, 41g and 41h of the diaphragm mask 41, and regular lens components 51i, 51j, 51k and 51l (side component 51N) corresponding to apertures 41i, 41j, 41k and 41l of the diaphragm mask 41, as shown in the enlarged frontal view of the re-imaging lens in FIG. 4.

The photosensitive element 61 is composed of element rows 61a, 61b, 61c and 61d (center component 61L), element rows 61e, 61f, 61g and 61h (side component 61M), and element rows 61i, 61j, 61k and 61l (side component 61N), as shown in the enlarged frontal view of the photosensitive element in FIG. 6. Light rays that pass through apertures 41L, 41M and 41N of the diaphragm mask 41 pass through regular lens components 51L, 51M and 51N of the re-imaging lens 51 and are guided to the corresponding element rows of the photosensitive element 61.

With a focus state detection device having the described structure, detection of the focussing of the shooting lens is conducted in the manner described below.

Light rays that pass through the shooting lens on the optical axis 0 of the shooting lens pass through the aperture 21L of the field mask 21 positioned near the predicted focussing plane of the shooting lens, through which the focus state detection region on the photographic field and the direction of the intensity distribution of the subject used in focus state detection are stipulated (ascertained). Light rays that pass through the approximately rectangular aperture 211 of the field mask 21 in the horizontal direction pass through the corresponding regular lens component 311 of the condenser lens 31 and are divided in two by apertures 41a and 41b of the diaphragm mask 41, the light rays divided in two by apertures 41a and 41b of the diaphragm mask 41 being re-composed into a pair of secondary images on element rows 61a and 61b of the photosensitive element 61 by the corresponding regular lens components 51a and 51b of the re-imaging lens. The focus position of the shooting lens is detected from the secondary images composed on element rows 61a and 61b of the photosensitive element 61 using the described principle.

Similarly, light rays that pass through the approximately rectangular aperture 212 of the field mask 21 in the vertical direction, which is perpendicular to the described approximately rectangular aperture 211, pass through the corresponding regular lens component 311 of the condenser lens 31 and are divided in two by apertures 51c and 51d of the diaphragm mask 41 and are re-composed into a pair of secondary images on element rows 61c and 61d of the photosensitive element by the corresponding regular lens components 41d and 41d of the re-imaging lens 41.

In this way, through the creation of a cross-shape by overlapping approximately rectangular apertures 211 and 212, focus state detection is possible from the intensity distribution of the subject in the two perpendicular directions, focus state detection being possible even when, for example, the contrast of the subject is in only one direction.

In addition, the focus position of the shooting lens can be similarly detected in the lateral areas of the photographic field by the focus state detection optical systems corresponding to apertures 21M and 21N of the field mask 21, which are provided off of the optical axis 0 of the shooting lens.

In FIG. 1, reference numbers 11, 12 and 13 designate exit pupils of the shooting lens, the image composed by superimposing exit pupils 11, 12 and 13 being comprised of the inverted projection image of an aperture of the diaphragm mask 41 via the condenser lens 31 at the same position.

Exit pupil 12 has a conjugal relationship with the diaphragm mask 41 via the condenser lens 31. Exit pupils 11 and 13 show how the position of the exit pupil in an actual shooting lens can vary depending upon the shooting lens, as described earlier. Exit pupil 11 is located at a position farther from the image plane of the shooting lens than is exit pupil 12, whereas exit pupil 13 is located at a position closer to the image plane of the shooting lens than exit pupil 12.

A frontal view of the inverted projection images of the apertures of the diaphragm mask 41 via the condenser lens 31 at the position of exit pupil 12 is shown in FIG. 6. As is clear from this figure and FIG. 3, aperture 41a of the diaphragm mask 41 corresponds to inverted projection image 12a, aperture 41b corresponds to inverted projection image 12b, aperture 41c corresponds to inverted projection image 12c, and aperture 41d corresponds to inverted projection image 12d, via regular lens component 311 of condenser lens 31.

In addition, by making the magnification of the regular lens components 311, 312 and 313 of the condenser lens 31 the same, the regular lens components 312 and 313 of the condenser lens 31 are positioned so that apertures 41e, 41f, 41g and 41h of the diaphragm mask 41 correspond to the inverted projection images 12a, 12b, 12c and 12d via regular lens component 312 of the condenser lens 31, and apertures 41i, 41j, 41k and 41l of the diaphragm mask 41 correspond to the inverted projection images 12a, 12b, 12c and 12d via regular lens component 313 of the condenser lens 31.

In other words, the inverted projection image 12a of exit pupil 12 is comprised of the inverted projection image of apertures 41a, 41e and 41i of the diaphragm mask 41 via the three regular lens components 311, 312 and 313 of the condenser lens 31.

Inverted projection images 12b, 12c and 12d are also each similarly comprised of the inverted projection images of three corresponding apertures of the diaphragm mask 41.

As shown in FIG. 7, the inverted projection images 13a, 13b, 13c, 13d, 13e, 13f, 13g, 13h, 13i, 13j, 13k and 13l of the apertures of the diaphragm mask 41 through the condenser lens 31 at the position of the exit pupil 13 correspond to apertures 41a, 41b, 41c, 41d, 41e, 41f, 41g, 41h, 41i, 41j, 41k and 41l of the diaphragm mask 41, respectively, the regular lens components 311, 312 and 313 of the condenser lens 31 being positioned so that these inverted projection images overlap at the position of exit pupil 12. Hence, at exit pupil 13, which is located at a position closer than exit pupil 12, inverted projection images 13e, 13f, 13g, 13h, 13i, 13j, 13k and 13l corresponding to the focus state detection regions positioned off of the optical axis 0 of the shooting lens are projected to a position off of the optical axis 0 of the shooting lens.

Consequently, out of the pair of inverted projection images 13e and 13f corresponding to the focus state detection regions positioned in the radial direction (see arrow R in FIG. 1) relative to the optical axis 0 of the shooting lens and provided off of the optical axis 0 of the shooting lens, inverted projection image 13f protrudes from the exit pupil 13, causing an eclipse to be created in the focus state detection light rays, thereby causing a substantial loss in the symmetry of the pairs of light rays, making focus state detection impossible.

As shown in FIG. 8, the inverted projection images 11a, 11b, 11c, 11d, 11e, 11f, 11g, 11h, 11i, 11j, 11k and 11l of the apertures of the diaphragm mask 41 through the condenser lens 31 at the position of the exit pupil 11 correspond to apertures 41a, 41b, 41c, 41d, 41e, 41f, 41g, 41h, 41i, 41j, 41k and 41l of the diaphragm mask 41, respectively, and similarly, out of the pair of inverted projection images 11e and 11f corresponding to focus state detection regions positioned in the radial direction (see arrow R in FIG. 1) relative to the optical axis 0 of the shooting lens and provided off of the optical axis 0 of the shooting lens, inverted projection image 11e protrudes from the exit pupil 11, causing an eclipse to be created in the focus state detection light rays, causing a substantial loss in the symmetry of the pairs of light rays, making focus state detection impossible.

In order to prevent the effects of eclipsing caused by the exit pupils of the shooting lens, which becomes a problem when focus state detection regions are provided in the lateral areas of the photographic field, Japanese Laid Open Patent Application No. 63-284513 discloses a well-known method whereby the surface area of the diaphragm apertures of the diaphragm mask is made smaller, and the two divided regions of the exit pupil are made smaller in a focus state detection optical system having focus state detection regions in the lateral areas of the photographic field.

Furthermore, Japanese Laid Open Patent Application No. 1-288810 proposes a method wherein the shape and the distance between the centers of the diaphragm apertures are varied between the lateral areas and the center of the focus state detection regions, the shape and the distance between the centers of the two divided regions of the exit pupil being varied in a focus state detection optical system having focus state detection regions in the center and in the lateral areas of the photographic field.

However, both of these methods were proposed in order to effect improvement relative to focus state detection optical systems having focus state detection regions positioned in the circumferential direction (refer to arrow P in FIG. 1) and off of the optical axis of the shooting lens, and are not methods for solving the lack of symmetry caused by eclipsing of the light rays passing through the two regions of the exit pupil in a focus state detection optical system, wherein the focus state detection regions are positioned in the radial direction relative to the optical axis of the shooting lens, as described above. Moreover, these methods give no indication relating to a plurality of focus state detection optical systems in which the various focus state detection regions are perpendicular and are positioned in the lateral areas of the photographic field.

SUMMARY OF THE INVENTION

In consideration of the foregoing, it is an object of the present invention to provide a focus state detection device having high focus state detection precision without the eclipsing of focus state detection light rays caused by the exit pupil of the shooting lens in a focus state detection device comprised of focus state detection optical systems having focus state detection regions that extend in the radial direction relative to the optical axis of the shooting lens and that are off of the optical axis of the shooting lens (in the lateral areas of the screen).

It is another object of the present invention to provide a focus state detection device having high focus state detection precision without focus state detection light rays that perform focus detection in the lateral areas of the photographic field being eclipsed because of the exit pupil of the shooting lens, the focus state detection device including a plurality of focus state detection optical systems having perpendicular focus state detection regions positioned off of the optical axis of the shooting lens.

These and other objects and advantages of the invention are achieved by providing a focus state detection device including at least two focus state detection optical systems having a condenser lens positioned near the predicted focussing plane of the object lens, a diaphragm mask provided behind the condenser lens and having a pair of apertures that divide the exit pupil of the object lens into two regions, and a pair of re-imaging lenses corresponding to the apertures in the diaphragm mask, wherein in each focus state detection optical system, images from the object lens are composed into secondary images on a pair of rows of photosensitive elements, the focussing state of the object lens being detected from the positional relationship between the secondary images; wherein at least the two focus state detection optical systems have a first focus state detection region located on the optical axis at the predicted focussing plane of the object lens, and a second focus state detection region located in the radial direction of the object lens off the optical axis at the predicted focussing plane, the distance between outer edges of the pair of apertures of the diaphragm mask corresponding to the second focus state detection region being established so as to be smaller than the distance between outer edges of the pair of apertures of the diaphragm mask corresponding to the first focus state detection region.

In accordance with another aspect of the invention, there is provided a focus state detection device including at least two focus state detection optical systems having re-imaging lens systems equipped with a condenser lens positioned near the predicted focussing plane of the object lens, a diaphragm mask provided behind the condenser lens and having a pair of apertures that divide the exit pupil of the object lens into two regions, and a pair of re-imaging lenses corresponding to the apertures in the diaphragm mask, wherein through the re-imaging lens systems, images from the object lens are composed into secondary images onto a pair of rows of photosensitive elements, the focussing state of the object lens being detected from the positional relationship between these secondary images; wherein at least the two focus state detection optical systems have a first focus state detection region located off the optical axis at the predicted focussing plane of the object lens positioned along the circumferential direction of this object lens, and a second focus state detection region located in a radial direction perpendicular to the first focus state detection region, the distance between outer edges of the pair of apertures of the diaphragm mask corresponding to the second focus state detection region being established so as to be smaller than the distance between outer edges of the pair of apertures of the diaphragm mask corresponding to the first focus state detection region.

In the focus state detection devices of the invention, it is desirable for the distance between the centers of the pair of apertures of the diaphragm mask corresponding to the second focus state detection region to be established so as to be smaller than the distance between the centers of the pair of apertures of the diaphragm mask corresponding to the first focus state detection region. Alternatively, it is desirable for the distance between inner edges of the pair of apertures of the diaphragm mask corresponding to the second focus state detection region to be established so as to be smaller than the distance between inner edges of the pair of apertures of the diaphragm mask corresponding to the first focus state detection region.

In another arrangement, the distance between the centers of the pair of apertures of the diaphragm mask corresponding to the second focus state detection region should be established so as to be approximately equal to the distance between the centers of the pair of apertures of the diaphragm mask corresponding to the first focus state detection region. In this case, the circumference touching the outer edges of the pair of apertures of the diaphragm mask corresponding to the second focus state detection region is configured so as to be encompassed by the circumference touching the outer edges of the pair of apertures of the diaphragm mask corresponding to the first focus state detection region. Alternatively, the circumference touching the outer edges of the pair of apertures of the diaphragm mask corresponding to the second focus state detection region and the circumference touching the outer edges of the pair of apertures of the diaphragm mask corresponding to the first focus state detection region roughly match. The inscribed circle touching the inner edges of the pair of apertures of the diaphragm mask corresponding to the second focus state detection region may be configured to surround the inscribed circle touching the inner edges of the pair of apertures of the diaphragm mask corresponding to the first focus state detection region. It is also possible for the size of the pair of apertures of the diaphragm mask corresponding to the second focus state detection region and the size of the pair of apertures of the diaphragm mask corresponding to the first focus state detection region to be approximately equal.

With the described structure, it is desirable for the device to be further equipped with a field mask in front of the condenser lens having apertures positioned near the predicted focussing plane of the object lens, in order to restrict each of the focus state detection regions. In addition, it is desirable for the device to further comprise at least six focus state detection optical systems corresponding to six focus state detection regions, wherein the six focus state detection regions are comprised of a first pair of focus state detection regions positioned so as to be mutually perpendicular on the optical axis of the object lens, a second pair of focus state detection regions positioned so as to be mutually perpendicular off the optical axis to one side, and a third pair of focus state detection regions positioned so as to be mutually perpendicular on the side opposite the second pair of focus state detection regions relative to the optical axis.

Among the focus state detection regions positioned off the optical axis of the shooting lens, by making the distance between outer edges of the aperture pair of the diaphragm mask corresponding to the focus state detection regions positioned along a radial direction relative to the optical axis of the shooting lens smaller than the distance between the outer edges of the aperture pair of the diaphragm mask corresponding to the focus state detection regions positioned along a circumferential direction relative to the optical axis of the shooting lens (or the aperture pair of the diaphragm mask corresponding to focus state detection regions positioned on the optical axis), focus detection light rays are not eclipsed even in shooting lenses with different exit pupil positions. As a result, focus state detection precision is improved.

When the sizes of all apertures in the diaphragm mask are made to be equal, the focus state detection regions off the optical axis and on the optical axis are of the same optical value, so there is no decline in sensitivity, even in focus state detection regions off the optical axis.

In addition, when the distance between aperture pairs is made large, it is possible to make the opening angle at the center of the pair of focus state detection light rays, the so-called center opening angle, large, thereby maintaining good focus state detection precision, even in focus state detection regions off the optical axis.

BRIEF DESCRIPTION OF THE DRAWINGS

These and other aspects and advantages of the present invention will become apparent from the following detailed description of preferred embodiments when taken in conjunction with the accompanying drawings, in which.

DETAILED DESCRIPTION OF PREFERRED EMBODIMENTS

Figure 1:
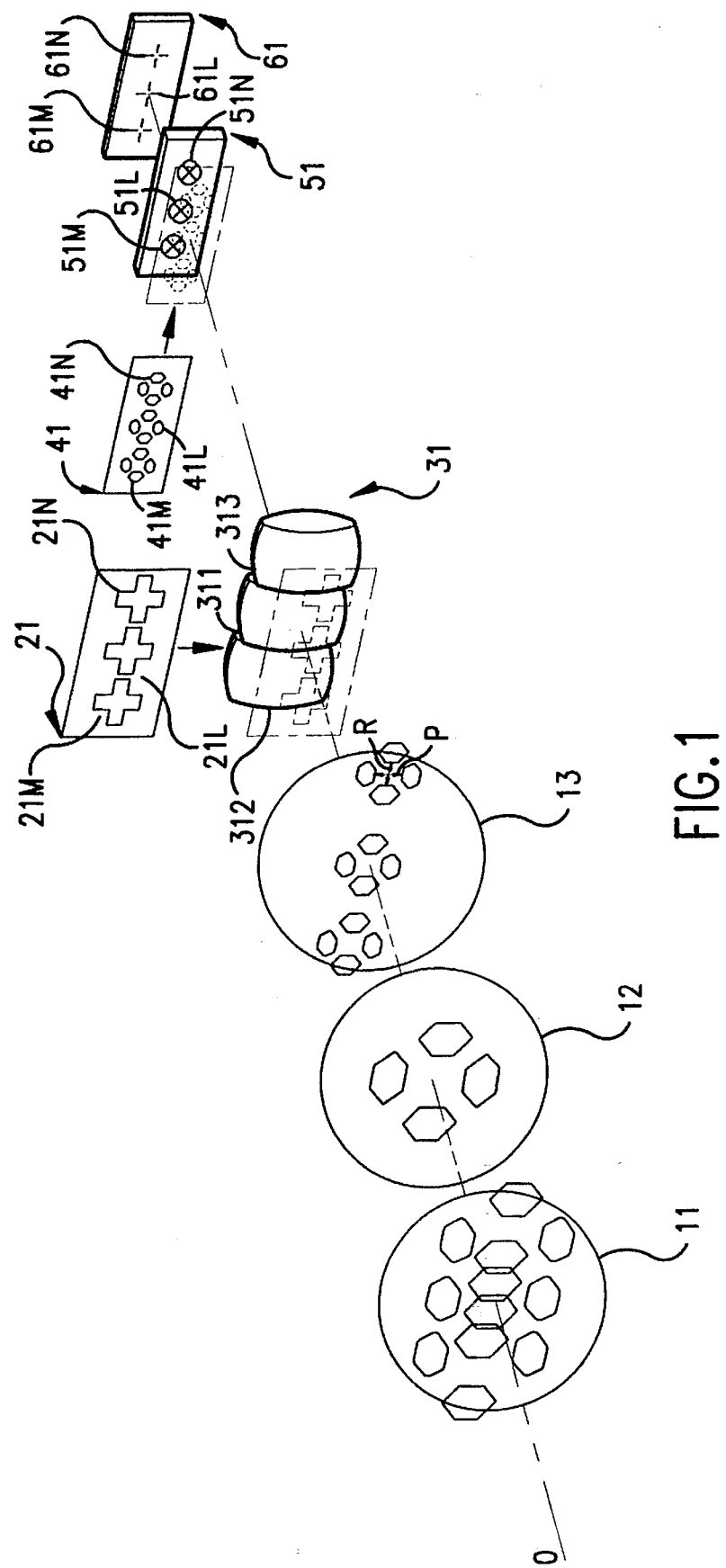
FIG. 1 is an oblique view showing the basic configuration of a focus state detection device.
Figure 2:
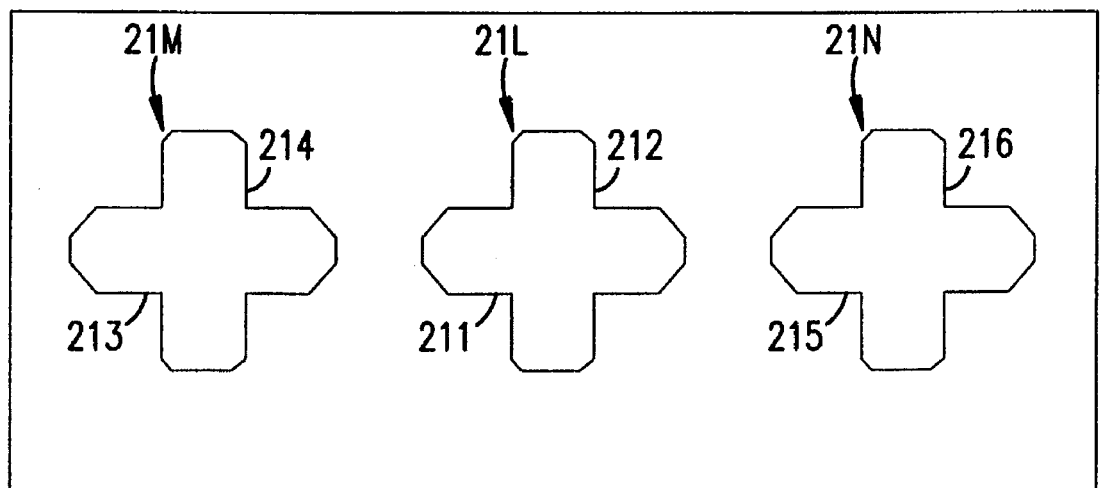
FIG. 2 is a frontal view of a field mask.
Figure 3:
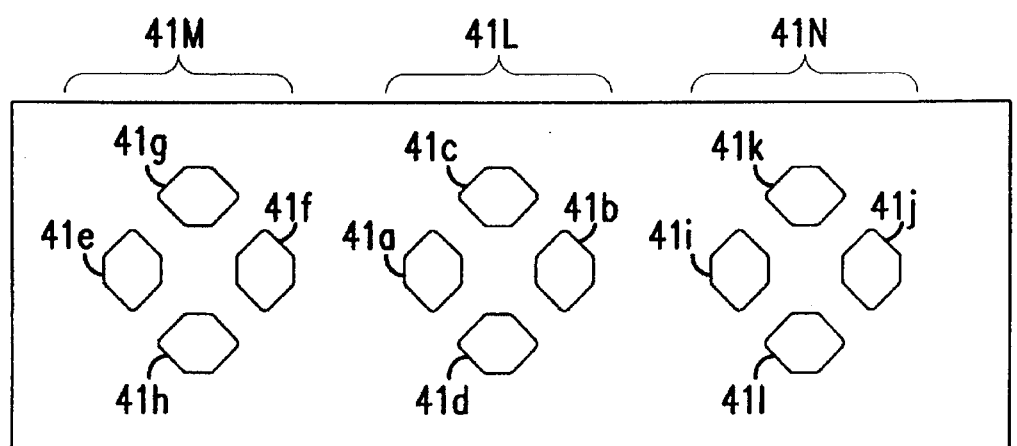
FIG. 3 is a frontal view of a diaphragm mask.
Figure 4:
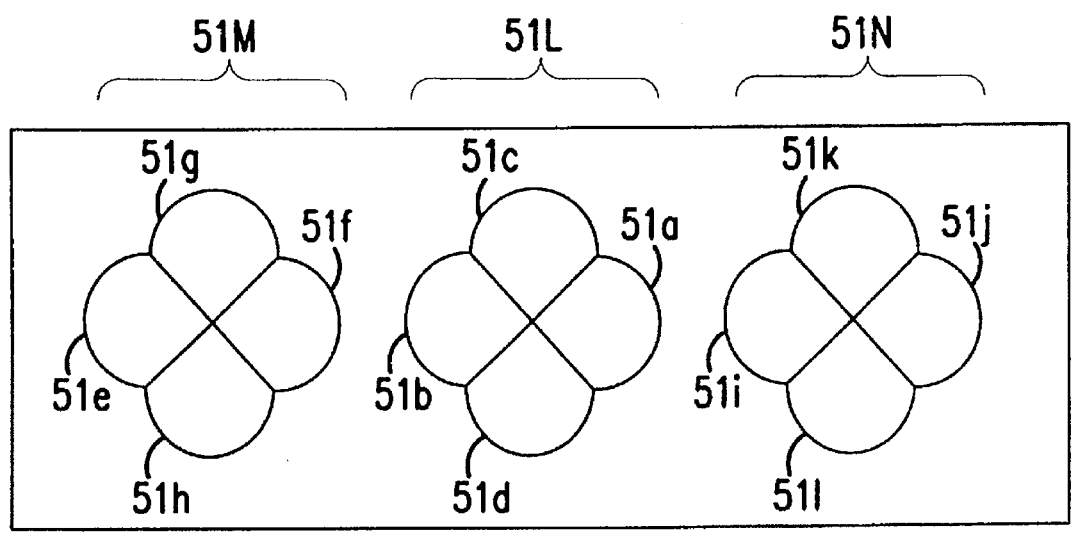
FIG. 4 is a frontal view of a re-imaging lens.
Figure 5:
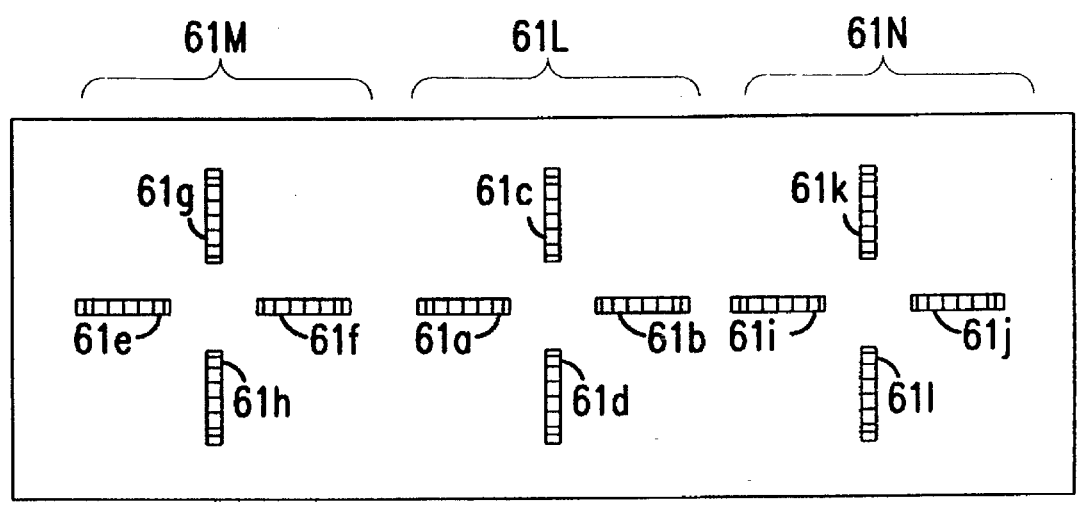
FIG. 5 is a frontal view of a photosensitive element.
Figure 6:
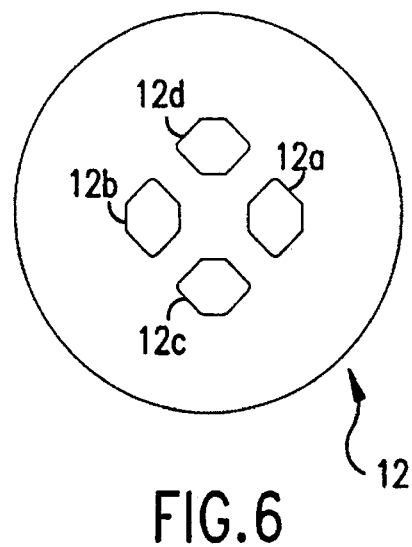
FIG. 6 is a frontal view of an exit pupil.
Figure 7:
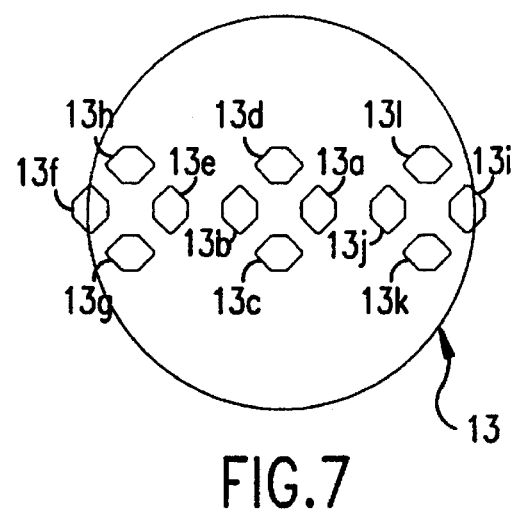
FIG. 7 is a frontal view of an exit pupil.
Figure 8:
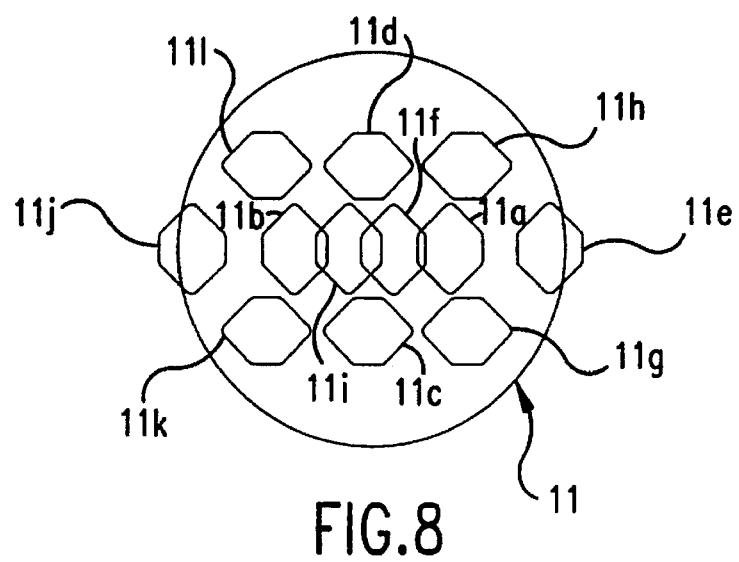
FIG. 8 is a frontal view of an exit pupil.

The present invention is described in detail hereafter, with reference to embodiments shown in the drawings.

The focus state detection device of the present invention has the same basic components as the device shown in FIG. 1, namely the same field mask, condenser lens, re-imaging lens and photosensitive element. In other words, in the following embodiments, the diaphragm mask in FIG. 1 is replaced by the diaphragm masks shown in the below-described FIGS. 9, 12 and 13.

Figure 9:
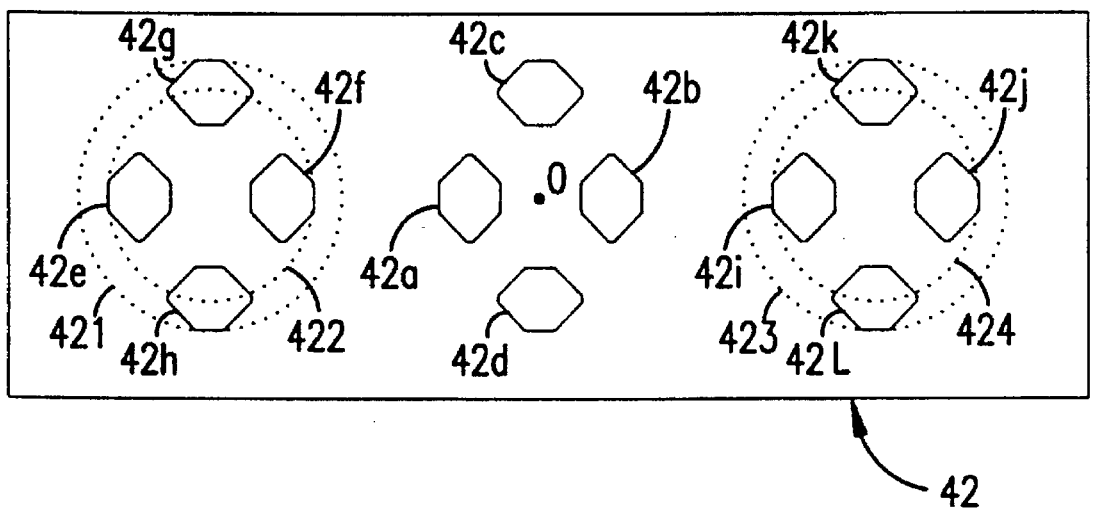
FIG. 9 is a frontal view of a diaphragm mask showing a first embodiment of the present invention.

FIG. 9 shows the configuration of one example of a diaphragm mask for the focus state detection optical system of an embodiment of the present invention, in which apertures 42a, 42b, 42c and 42d of the diaphragm mask 42 correspond to focus state detection regions on the optical axis 0 of the shooting lens, and apertures 42e, 42f, 42g, 42h, 42i, 42j, 42k and 42l correspond to focus state detection regions off the optical axis 0 of the shooting lens.

The outer circle 421 indicated by the dotted line (to the left in FIG. 9) indicates a circumference for apertures 42g and 42h of the diaphragm mask 42 corresponding to focus state detection regions that extend in the circumferential direction relative to the optical axis 0 of the shooting lens and that are provided off the optical axis 0 of the shooting lens. The inner circle 422 indicated by the dotted line indicates a circumference for apertures 42e and 42f of the diaphragm mask 42 corresponding to focus state detection regions that extend in a radial direction relative to the optical axis 0 of the shooting lens and that are provided off the optical axis 0 of the shooting lens. Similarly, outer circle 423 indicated by the dotted line (to the right in FIG. 9) is a circumference for apertures 42k and 42l, and inner circle 424 indicated by the dotted line is a circumference for apertures 42i and 42j.

An important characteristic of the configuration of the diaphragm mask 42 shown in FIG. 9 is that the size (shape and area) of all of the apertures 42a–42l is the same, the distance between the aperture pair 42e and 42f (and between 42i and 42j) corresponding to focus state detection regions that extend in a radial direction relative to the optical axis 0 and that are off the optical axis 0 of the shooting lens being smaller than the distance between the aperture pair 42g and 42h (and between 42k and 42l), which correspond to focus state detection regions that extend in the circumferential direction. The distance between aperture pairs is comprised of the distance between the centers of the two apertures (or the distance between the outer edges of the aperture pair, or the distance between inner edges). The distance between the aperture pair 42e and 42f (and between 42i and 42j) corresponding to focus state detection regions off the optical axis 0 of the shooting lens and extending in a radial direction relative to the optical axis 0 is established so as to be smaller than the distance between the aperture pair 42a and 42b corresponding to focus state detection regions in the center.

Figure 10:
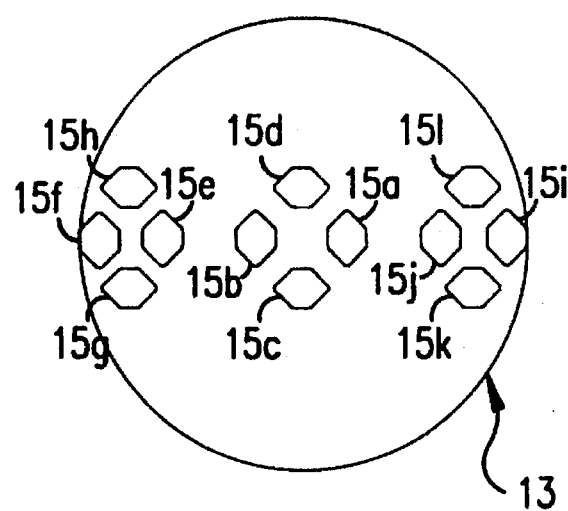
FIG. 10 is a frontal view of an exit pupil.

FIG. 10 shows the inverted projection image of the diaphragm mask 42 onto exit pupil 13 (see FIG. 1) of the shooting lens, in which inverted projection images 15a, 15b, 15c, 15d, 15e, 15f, 15g, 15h, 15i, 15j, 15k and 15l correspond to apertures 42a, 42b, 42c, 42d, 41e, 41f, 41g, 41h, 41i, 41j, 41k and 41l, respectively.

In this instance, with inverted projection images 15e, 15f, 15g and 15h corresponding to focus state detection regions off the optical axis 0 of the shooting lens, inverted projection image 15f does not protrude from the exit pupil 13, so an eclipse is not created, because the distance between apertures 42e and 42f, which correspond to focus state detection regions that are positioned in a radial direction relative to the optical axis 0 of the shooting lens, is smaller than the distance between the apertures 42g and 42h, which correspond to focus state detection regions positioned in a circumferential direction relative to the optical axis 0 of the shooting lens. As a result, there is no loss in the focus state detection light rays.

Figure 11:
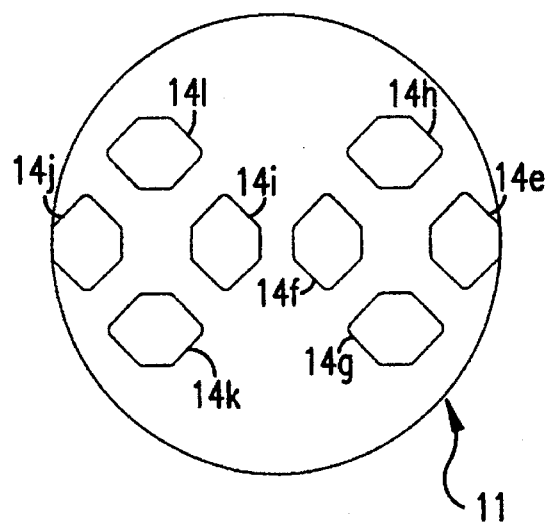
FIG. 11 is a frontal view of an exit pupil.

FIG. 11 shows the inverted projection images of the apertures of the diaphragm mask 42 onto exit pupil 11 of the shooting lens, wherein inverted projection images 14e, 14f, 14g, 14h, 14i, 14j, 14k and 14l correspond to apertures 42e, 42f, 42g, 42h, 42i, 42j, 42k and 42l, respectively. Inverted projection images corresponding to apertures 42a, 42b, 42c and 42d of the diaphragm mask 42 are omitted in the drawing.

Because the distance between apertures 42e and 42f, and the distance between 42i and 42j, which correspond to the focus state detection regions positioned in a radial direction relative to the optical axis 0 of the shooting lens, is smaller than the distance between apertures 42g and 42h and the distance between 42k and 42l, which correspond to focus state detection regions positioned in a circumferential direction relative to the optical axis 0 of the shooting lens, as explained with reference to FIG. 10 also, the inverted projection images 14e and 14i of apertures 42e and 42i of the diaphragm mask 42, which correspond to focus state detection regions off the optical axis 0 of the shooting lens and positioned along a radial direction relative to the optical axis 0 of the shooting lens, do not protrude from the exit pupil 11, so an eclipse is not created. Because of this, there is no loss of focus state detection light rays.

As explained above, when focus state detection regions are in the lateral areas of the photographic field and are positioned along a radial direction relative to the optical axis of the shooting lens, eclipsing is more easily created than in focus state detection regions positioned along a circumferential direction relative to the optical axis of the shooting lens because the actual exit pupil position of the shooting lens varies greatly between shooting lenses. The described configuration effects focus state detection in which this problem is solved.

In other words, the described problem is solved, and good focus state detection is effected even in focus state detection regions off the optical axis 0 of the shooting lens and positioned along a radial direction relative to the optical axis 0 of the shooting lens. In addition, with this embodiment, the focus state detection regions off the optical axis and those on the optical axis have the same optical values because the sizes of the apertures are all the same, thereby preventing a decline in sensitivity in focus state detection regions off the optical axis.

Figure 12:
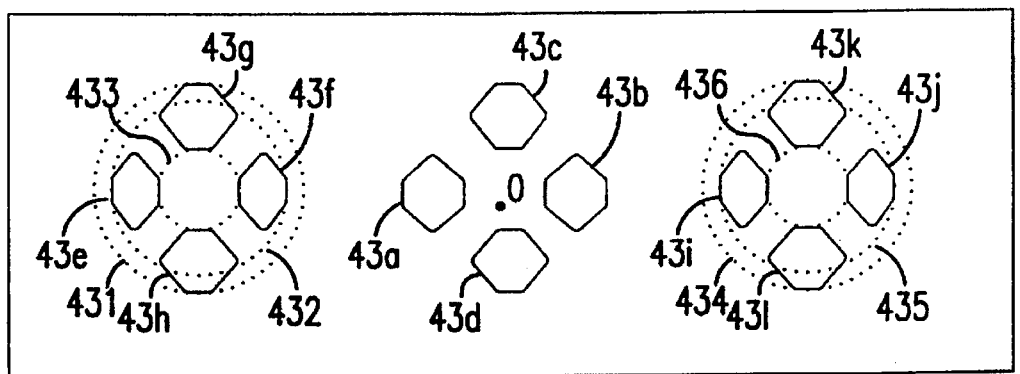
FIG. 12 is a frontal view of a diaphragm mask showing another embodiment of the present invention.

FIG. 12 shows the diaphragm mask for a focus state detection optical system of another embodiment of the present invention.

An important characteristic of the diaphragm mask 43 of this embodiment is that the surface area of the aperture pair 43e and 43f (and 43i and 43j) for focus state detection regions off the optical axis 0 of the shooting lens and extending in a radial direction relative to the optical axis 0 is made smaller, and at the same time the circle 433 indicated by the dotted line touches the inner edges of apertures 43e, 43f, 43g and 43h. In other words, with this configuration, the distance between the inner edges of the aperture pair for focus state detection regions extending in a radial direction relative to the optical axis 0 of the shooting lens does not change, and only the distance between outer edges becomes smaller. With this configuration also, the problem of eclipsing in the exit pupil of the shooting lens is solved in the same manner as with the first embodiment. In addition, because the distance between apertures 43e and 43f is larger than in the first embodiment, the opening angle at the center of the pair of focus detection light rays, which is the so-called center opening angle, can be made larger. As a result, focus state detection precision can be maintained even in focus state detection regions off the optical axis.

Figure 13:
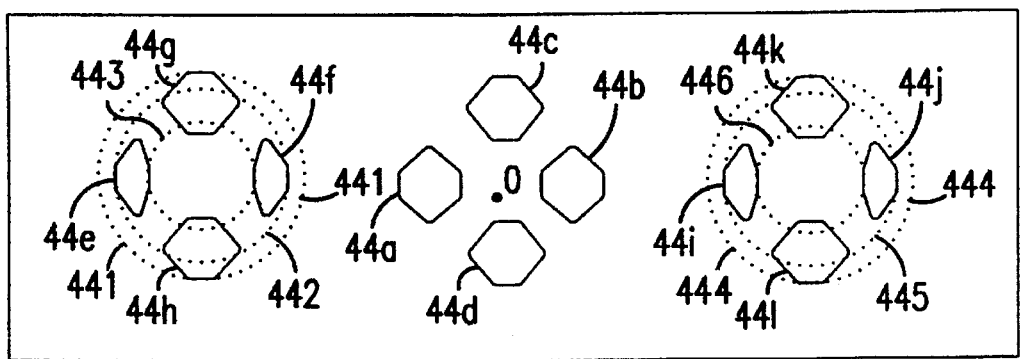
FIG. 13 is a frontal view of a diaphragm mask showing another embodiment of the present invention.
Figure 14:
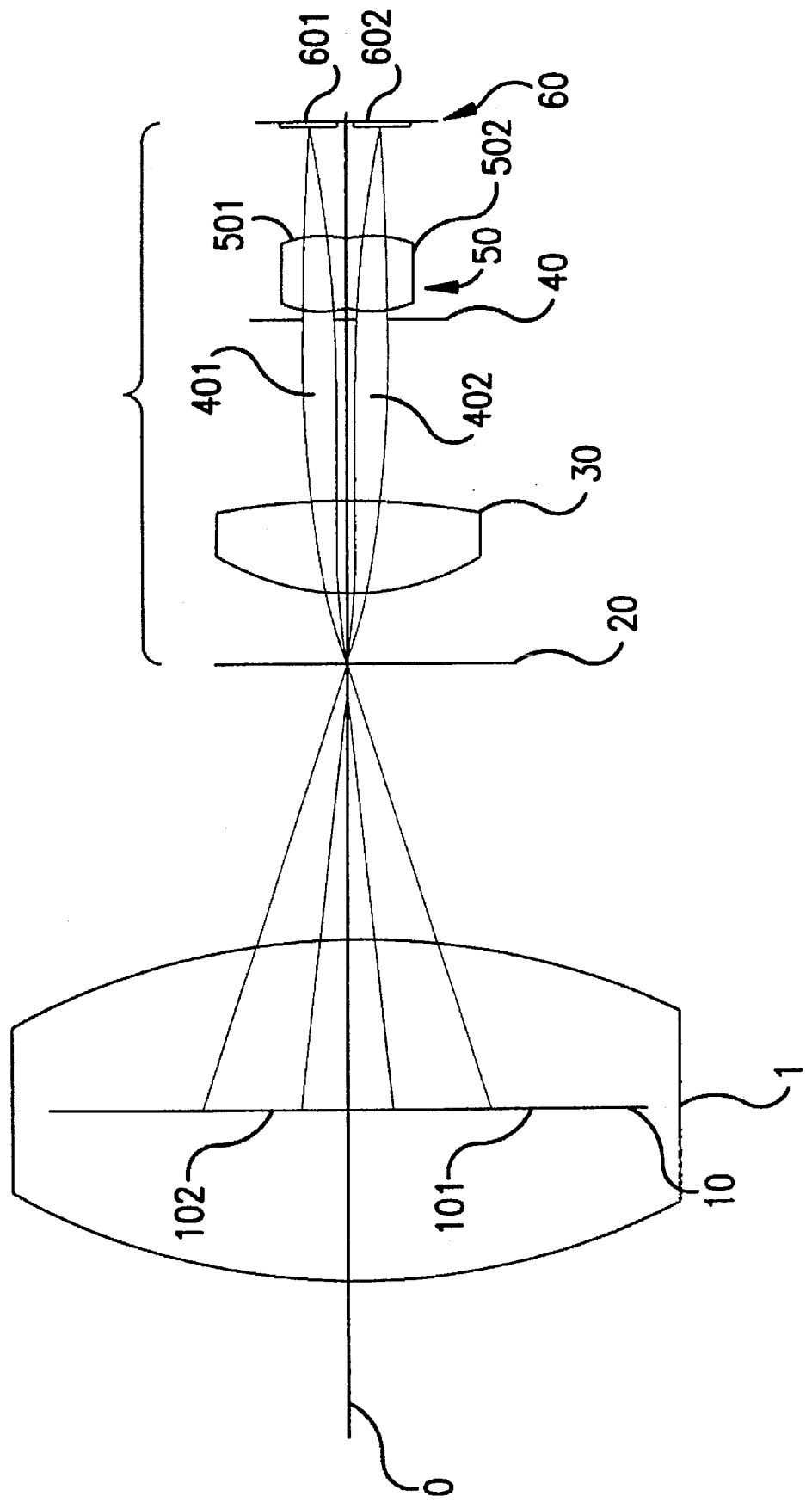
FIG. 14 is a schematic drawing showing the principle behind the phase difference detection method.
Figure 15:
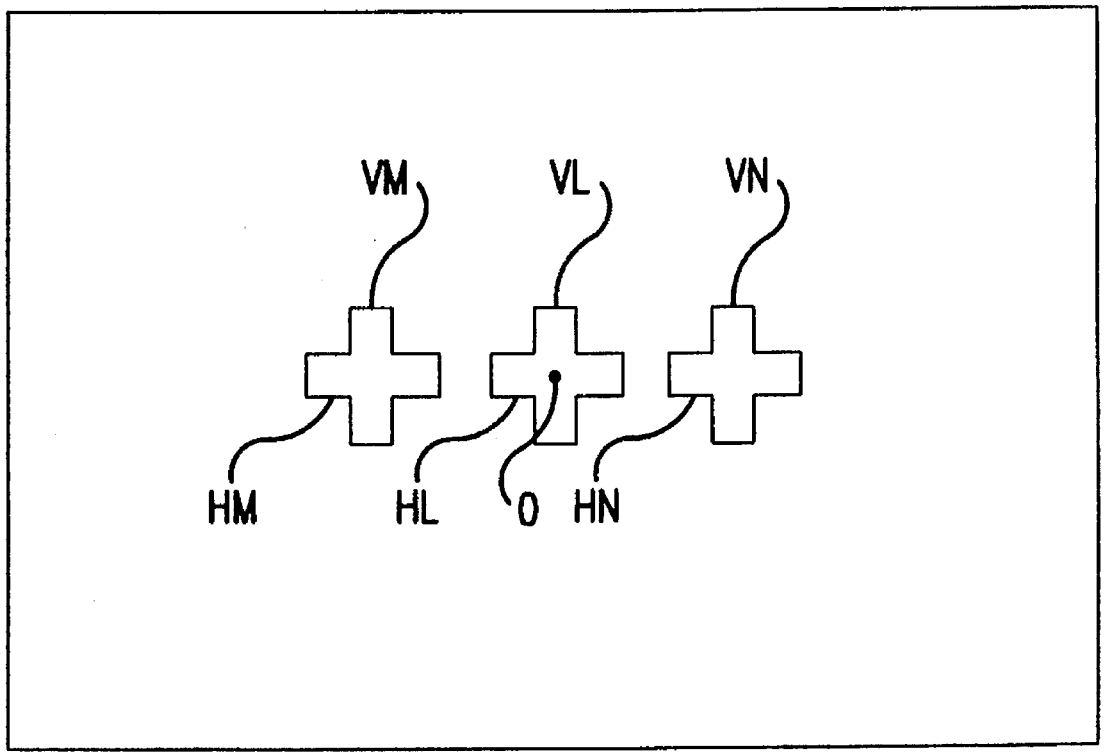
FIG. 15 is an explanatory drawing of focus state detection regions as seen from the viewfinder of the camera.

FIG. 13 shows the configuration of a diaphragm mask 44 in a third embodiment of the present invention. An important characteristic of the diaphragm mask 44 is that the surface area of the aperture pair 44e and 44f for focus state detection regions extending in a radial direction relative to the optical axis 0 of the shooting lens has been reduced, but the distance between the centers of these apertures is the same as the distance between the centers of apertures 44g and 44h (or between apertures 44a and 44b). In other words, the distance between outer edges of the aperture pair for focus state detection regions extending in a radial direction relative to the optical axis 0 of the shooting lens is made smaller, while the distance between inner edges is enlarged. With this configuration also, it is possible to solve the described problem of eclipsing. In addition, with the present embodiment, the center opening angle can be kept large so that focus state detection precision can be maintained.

As is clear from the above explanation, when the focus state detection regions along a radial direction relative to the optical axis of the shooting lens in the lateral areas of the photographic field are established, with regard to the problems of eclipsing of focus state detection light rays by the shooting lens and the loss of part of the focus state detection light rays, the focus state detection device of the present invention prevents the effects of eclipsing by the shooting lens by making the diaphragm apertures of focus state detection regions positioned along a radial direction relative to the optical axis of the shooting lens smaller than the diaphragm apertures of focus state detection regions positioned along a circumferential direction relative to the optical axis. As a result, it is possible to conduct highly precise focus state detection.

While the embodiments herein are preferred, it will be appreciated from this specification that various alternatives, modifications, variations or improvements therein may be made by those skilled in the art that are within the scope of the invention, which is defined by the following claims.

What is claimed is:

1. A focus state detection device having an object lens, an object lens exit pupil and an optical axis extending through a center of the object lens and the exit pupil, the focus state detection device comprising:

at least first and second focus state detection optical systems, each of said first and second focus state detection optical systems comprising a diaphragm mask having a pair of apertures that divide the object lens exit pupil into two regions, the first and second focus state detection optical systems further including first and second focus state detection regions positioned off the optical axis of the object lens, wherein a distance between outer edges of the pair of apertures corresponding to the second focus state detection region is smaller than a distance between outer edges of the pair of apertures of the diaphragm mask corresponding to the first focus state detection region, and wherein a line extending between and terminating at a center of each of the pair of apertures corresponding to the first focus state detection region intersects a line extending between and terminating at a center of each of the pair of apertures corresponding to the second focus state detection region.

2. The focus state detection device according to claim 1, wherein a distance between inner edges of the pair of apertures of the diaphragm mask corresponding to the second focus state detection region is smaller than a distance between inner edges of the pair of apertures of the diaphragm mask corresponding to the first focus state detection region.

3. The focus state detection device according to claim 1, wherein said first focus state detection region is positioned along a circumferential direction with respect to the optical axis, and wherein said second focus state detection region is positioned along a radial direction with respect to the optical axis substantially perpendicular to the first focus state detection region.

4. The focus state detection device according to claim 3, wherein a distance between inner edges of the pair of apertures of the diaphragm mask corresponding to the second focus state detection region is smaller than a distance between inner edges of the pair of apertures of the diaphragm mask corresponding to the first focus state detection region.

5. The focus state detection device according to claim 1, wherein a distance between centers of the pair of apertures of the diaphragm mask corresponding to the second focus state detection region is smaller than a distance between centers of the pair of apertures of the diaphragm mask corresponding to the first focus state detection region.

6. The focus state detection device according to claim 1, wherein a distance between centers of the pair of apertures of the diaphragm mask corresponding to the second focus state detection region is substantially equal to a distance between centers of the pair of apertures of the diaphragm mask corresponding to the first focus state detection region.

7. The focus state detection device according to claim 1, wherein a circumference touching the outer edges of the pair of apertures of the diaphragm mask corresponding to the second focus state detection region is encompassed by a circumference touching the outer edges of the pair of apertures of the diaphragm mask corresponding to the first focus state detection region.

8. The focus state detection device according to claim 7, wherein an inscribed circle touching inner edges of the pair of apertures of the diaphragm mask corresponding to the second focus state detection region and an inscribed circle touching inner edges of the pair of apertures of the diaphragm mask corresponding to the first focus state detection region substantially match each other.

9. The focus state detection device according to claim 7, wherein an inscribed circle touching inner edges of the pair of apertures of the diaphragm mask corresponding to the second focus state detection region encompasses an inscribed circle touching inner edges of the pair of apertures of the diaphragm mask corresponding to the first focus state detection region.

10. The focus state detection device according to claim 7, wherein a size of the pair of apertures of the diaphragm mask corresponding to the second focus state detection region and a size of the pair of apertures of the diaphragm mask corresponding to the first focus state detection region are substantially equal.

11. The focus state detection device according to claim 1, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

12. The focus state detection device according to claim 2, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

13. The focus state detection device according to claim 3, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

14. The focus state detection device according to claim 4, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

15. The focus state detection device according to claim 5, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

16. The focus state detection device according to claim 6, further comprising at least four ad n focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

17. The focus state detection device according to claim 7, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

18. The focus state detection device according to claim 8, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

19. The focus state detection device according to claim 9, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

20. The focus state detection device according to claim 10, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

21. A focus state detection device comprising at least two focus state detection optical systems each having a condenser lens positioned near a predicted focussing plane of an object lens, a diaphragm mask disposed behind the condenser lens and including a pair of apertures that divide an exit pupil of the object lens into two regions, and a pair of re-imaging lenses corresponding to the pair of apertures in the diaphragm mask, wherein in each focus state detection optical system, images from the object lens are composed into secondary images on a pair of rows of photosensitive elements, a focussing state of the object lens being detected from a positional relationship between the secondary images, wherein the at least two focus state detection optical systems have a first focus state detection region located off an optical axis of the predicted focussing plane and positioned along a circumferential direction with respect to the optical axis and a second focus state detection region positioned along a radial direction with respect to the optical axis substantially perpendicular to the first focus state detection region, a distance between outer edges of the pair of apertures of the diaphragm mask corresponding to the second focus state detection region being smaller than a distance between outer edges of the pair of apertures of the diaphragm mask corresponding to the first focus state detection region.

22. The focus state detection device according to claim 21, further comprising a field mask disposed in front of the condenser lens having apertures positioned near the predicted focussing plane of the object lens to restrict each of the focus state detection regions.

23. The focus state detection device according to claim 21, wherein a distance between inner edges of the pair of apertures of the diaphragm mask corresponding to the second focus state detection region is smaller than a distance between inner edges of the pair of apertures of the diaphragm mask corresponding to the first focus state detection region.

24. The focus state detection device according to claim 21, wherein a distance between centers of the pair of apertures of the diaphragm mask corresponding to the second focus state detection region is smaller than a distance between centers of the pair of apertures of the diaphragm mask corresponding to the first focus state detection region.

25. The focus state detection device according to claim 21, wherein a distance between centers of the pair of apertures of the diaphragm mask corresponding to the second focus state detection region is substantially equal to a distance between centers of the pair of apertures of the diaphragm mask corresponding to the first focus state detection region.

26. The focus state detection device according to claim 21, wherein a circumference touching the outer edges of the pair of apertures of the diaphragm mask corresponding to the second focus state detection region is encompassed by a circumference touching the outer edges of the pair of apertures of the diaphragm mask corresponding to the first focus state detection region.

27. The focus state detection device according to claim 26, wherein an inscribed circle touching inner edges of the pair of apertures of the diaphragm mask corresponding to the second focus state detection region and an inscribed circle touching inner edges of the pair of apertures of the diaphragm mask corresponding to the first focus state detection region substantially match each other.

28. The focus state detection device according to claim 26, wherein an inscribed circle touching inner edges of the pair of apertures of the diaphragm mask corresponding to the second focus state detection region encompasses an inscribed circle touching inner edges of the pair of apertures of the diaphragm mask corresponding to the first focus state detection region.

29. The focus state detection device according to claim 26, wherein a size of the pair of apertures of the diaphragm mask corresponding to the second focus state detection region and a size of the pair of apertures of the diaphragm mask corresponding to the first focus state detection region are substantially equal.

30. The focus state detection device according to claim 21, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

31. The focus state detection device according to claim 22, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

32. The focus state detection device according to claim 23, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

33. The focus state detection device according to claim 21, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

34. The focus state detection device according to claim 24, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

35. The focus state detection device according to claim 25, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

36. The focus state detection device according to claim 26, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

37. The focus state detection device according to claim 27, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

38. The focus state detection device according to claim 28, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

39. The focus state detection device according to claim 29, further comprising at least four additional focus state detection optical systems corresponding to four additional focus state detection regions, wherein the four additional focus state detection regions comprise a first additional pair of focus state detection regions positioned mutually perpendicular on the optical axis of the object lens and a second additional pair of focus state detection regions positioned mutually perpendicular off the optical axis.

40. A method of producing a focus state detection device comprising at least first and second focus state detection optical systems, each of said first and second focus state detection optical systems comprising a diaphragm mask having a pair of apertures that divide an object lens exit pupil into two regions, the first and second focus state detection optical systems further including first and second focus state detection regions, the method comprising:

positioning the apertures of the first focus state detection optical system off the optical axis;

positioning the apertures of the second focus state detection optical system substantially perpendicular to the apertures of the first focus state detection optical system; and forming the apertures such that a distance between outer edges of the pair of apertures corresponding to the second focus state detection region is smaller than a distance between outer edges of the pair of apertures of the diaphragm mask corresponding to the first focus state detection region, and a line extending between and terminating at a center of each of the pair of apertures corresponding to the first focus state detection region intersects a line extending between and terminating at a center of each of the pair of apertures corresponding to the second focus state detection region, thereby preventing eclipsing of focus state detection light rays caused by the object lens exit pupil.

* * * * *